No. 741,085. PATENTED OCT. 13, 1903.
S. J. WEBB.
OSCILLATING COTTON PRESS.
APPLICATION FILED JAN. 22, 1900.
NO MODEL. 2 SHEETS—SHEET 2.

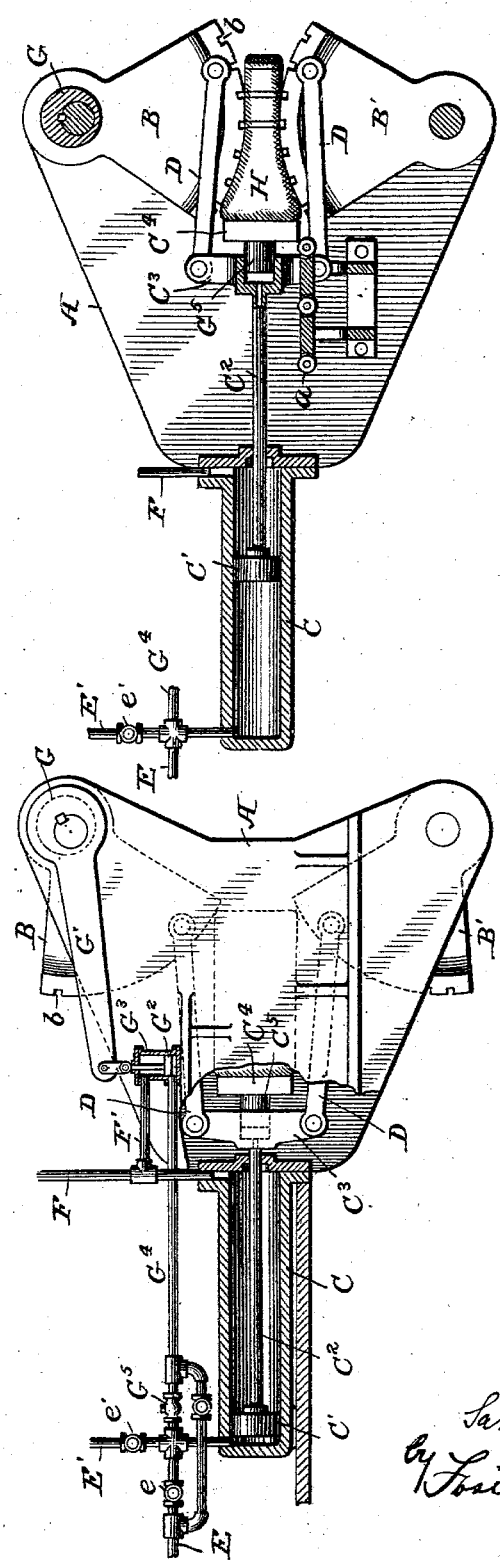

Witnesses
Inventor
Samuel J. Webb
Attorneys

No. 741,085. Patented October 13, 1903.

UNITED STATES PATENT OFFICE.

SAMUEL J. WEBB, OF MINDEN, LOUISIANA.

OSCILLATING COTTON-PRESS.

SPECIFICATION forming part of Letters Patent No. 741,085, dated October 13, 1903.

Application filed January 22, 1900. Serial No. 2,322. (No model.)

*To all whom it may concern:*

Be it known that I, SAMUEL J. WEBB, a citizen of the United States, residing at Minden, in the parish of Webster and State of Louisiana, have invented certain new and useful Improvements in Oscillating Cotton-Presses, of which the following is a specification.

My invention relates to what I have termed an "oscillating cotton-press," and has for its object to provide an improved press for pressing cotton in which the pressing action is progressive; and to these ends my invention consists in the various features of construction and arrangement of parts, having the mode of operation substantially as hereinafter more particularly set forth.

Figure 3:
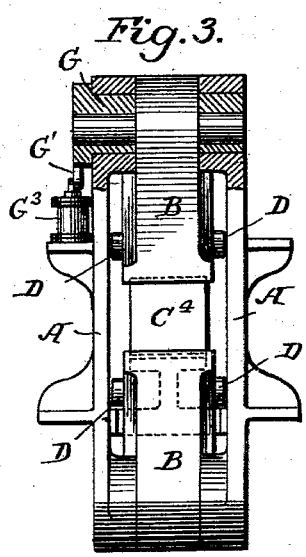
Figure 4:
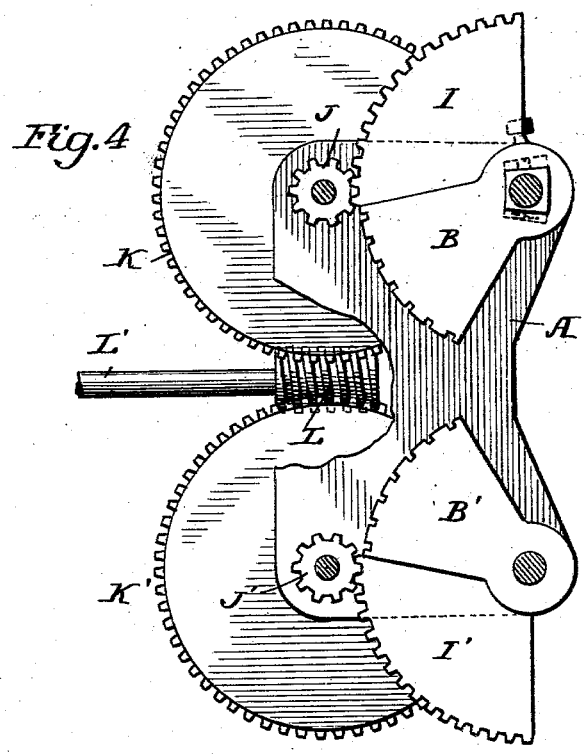

Referring to the accompanying drawings, Figure 1 is a longitudinal sectional view. Fig. 2 is a similar view showing the parts in their different positions. Fig. 3 is a vertical section upon the line through the bearings of the platens, Fig. 1; and Fig. 4 is a sectional view showing a different means of oscillating the segmental platens.

In my application, Serial No. 1,629, filed the 16th day of January, 1900, I have described and claimed what I have termed a "roller-compress," in which the bale of material is compressed progressively or in increments through the medium of compressing-rollers, and my present invention relates to the same general principles as I have therein set forth in considerable detail, but relates more particularly to a different embodiment of those principles wherein instead of rollers oscillating segments or sectors are utilized to produce the compression. In my present invention there is a frame A of two parts suitably secured together and supporting the operating portions of the press. Mounted on this frame are the oscillating segmental or sector-shaped platens B B', and one at least of these platens is mounted in adjustable bearings, so that the relations of the platens can be regulated, and as a refinement of the present invention I have shown one of the platens as provided with means for automatically adjusting the platens and varying the relations between the two platens in accordance with the pressure developed on the bale. These platens B B' are provided with notches $b$ to permit the passage of the bale-band, so that the bale can be tied while under pressure, and their faces may be constructed in the manner more particularly set forth in my prior application, and this need not be described with more particularity herein.

Some suitable means must be provided for operating the oscillating segmental platens, and while these means will vary materially according to the requirements of the work to be done, and they may be arranged, as shown herein, to initially feed the bale to the platens, other means may be utilized for feeding the bale and various other modifications and arrangements of the operating devices may be made by those skilled in the art without departing from the main features of the invention.

In the present instance, referring more particularly to Figs. 1 and 3, I have shown a hydraulic engine in the form of a cylinder C, in which moves a piston C', having a piston-rod $C^2$ connected to a cross-head $C^3$, and connected to this cross-head are the pitmen or connecting-rods D, which are also connected to the platens B B', so that the platens are oscillated as the piston reciprocates in the cylinder. In this particular construction there is connected to the cross-head $C^3$ a follower $C^4$, having a plunger $C^5$, fitting a chamber in the cross-head, and this chamber is connected, through the hollow piston-rod $C^2$, with the main hydraulic cylinder C. Any other means for starting the bale or forcing it into position between the bite of the platens may be used; but it is preferable to have some sort of a follower which will press with more or less force upon the rear end of the bale to prevent undue longitudinal extension of the bale under pressure. Arranged on the bed of the press I have shown friction-rollers $a$, which aid in moving the bale toward the platens and lessen the power necessary to move the bale.

The hydraulic cylinder C is connected to a source of power by a suitable supply-pipe E, having a proper valve $e$, and the cylinder is also provided with an exhaust-pipe E', having a valve $e'$, and of course it is desirable that these valves should be operated in proper relation to each other by some suitable means, all of which are well known to those skilled in the art and need not be specifically described herein.

In order to restore the piston to its normal position, (shown in Fig. 1,) the cylinder C is connected to some suitable source of supply—as, for instance, the city water-pipes or a tank—by means of a pipe F, and this is arranged to give sufficient pressure on the rear side of the piston to restore the parts to their normal positions, and when the piston is moved forward under hydraulic pressure this fluid may be forced back through the pipe F to its source of supply or to a suitable exhaust in a manner well understood.

In order that the relations of the platens to each other may be automatically varied, I have shown in the present instance one of the platens, as B, mounted on an eccentric bearing G, to which is attached an arm G', having a piston $G^2$ working in a cylinder $G^3$. This cylinder is connected at its upper end by a pipe F' to the pipe F, so that normally there is a certain limited pressure upon the upper side of the piston-cylinder to restore the relations of the segments to their normal condition and hold them in this relation. Connected to the lower portion of the cylinder $G^3$ is a pipe $G^4$, and this is connected to the front end of the hydraulic cylinder C or to the pipe E, leading to the source of supply therefor, and interposed in this pipe is a pressure-regulating valve $G^5$ of any usual and well-known construction. I may remark that in the drawings the cylinder $G^3$ is shown of somewhat small dimensions for the sake of clearness; but in practice, of course, it will be of suitable dimensions to give the proper adjustment to the eccentric bearing to accomplish the objects intended, the principle of operation, of course, being precisely the same.

Such being the general construction and arrangement of parts, the operation of the press will be generally understood, and it may be stated that the parts being in the positions indicated in Fig. 1, with the bale H on the bed, water is admitted to the cylinder-piston from the source of supply and passing through the hollow piston-rod $C^2$ the follower $C^4$ is operated to force the bale between the adjacent surfaces of the segmental platens and at or about the same time the piston moves, causing the platens B B' to oscillate toward each other, carrying and pressing the bale between their adjacent faces. It will be seen that the segmental platens operate practically on the principle of a continuously-operating toggle-joint, and as they oscillate their faces move over the corresponding faces of the bale, acting to progressively compress the same, so that the bale may be said to be compressed in increments, and it will be observed that the greatest pressure is attained when the various portions of the segments are in practically a right line between their bearing-points, and the material is then in the state of its greatest condensation or density, and it will be seen that the segments are then in a position to give the greatest pressure on the bale, this pressure acting substantially like an increasing toggle-pressure as the different parts or increments of the bale approach the right line just mentioned. Furthermore, in the arrangement shown the leverage or power of the pitmen in connection with the piston-rod increases as the middle portion of the bale is under pressure between the middle portions of the opposite segments.

The frame of the press is so arranged, as indicated, that while the bale is under the greatest pressure the bale ties or bands may be passed around the bale and secured in position, thereby preventing undue expansion of the bale after compression.

It is well known that successive bales of cotton especially may vary in size and quantity of material to some extent and that it is desirable to compress the bales to a substantially uniform density, and to accomplish this in the present invention the adjustable bearing of one of the platens is arranged to be operated automatically in accordance with the pressure exerted on the bale. If, for instance, the pressure on the bale is normal, the piston $G^2$ will remain in the position shown in Fig. 1 and the relations of the segments will remain uniform; but if the bale is abnormally large or for other reasons it offers greater obstruction to its passage between the segments the pressure of the operating fluid will overcome the pressure-regulating valve $G^5$ and it will be opened, so that the fluid will flow into the cylinder $G^3$ beneath the piston $G^2$ and the piston will be lifted, overcoming the normal pressure from the pipe F' and lifting the arm G' and changing the position of the shaft of the segment B, and consequently the relations between the segments B and B', so that each bale will be subjected to practically the same pressure, reducing the material of the bales to a substantially uniform density. When the piston is moved to its normal position, restoring the platens to the positions shown in Fig. 1, the pressure in the pipe $G^4$ is relieved, and the normal pressure in the pipe F' will cause the piston $G^2$ to assume its normal position. It will thus be seen that the relations of the platens are automatically adjusted through the medium of the bale itself reacting through the mechanism by which the bale is compressed. In order that the relations of the platens may be adjusted preliminary to the introduction of the bale between them, the pipe $G^4$ may be provided with a by-pass pipe and valve $G^6$, the operation of which will be readily understood by those skilled in the art.

While the oscillating platens are preferably operated in the manner already described, it is evident, as above intimated, that they can be differently operated, and in Fig. 4 for purposes of illustration I have shown a mechanical means for moving the segmental platens. In this case arranged on the shafts of the platens B B' is a segmental gear I I', which is preferably located outside the frame or in any other convenient position, and connected to these segmental gears are pinions J J' on studs or bearings supporting also worm-wheels K K', which are operated by a suitable worm L on the shaft L', which shaft, of course, is to be driven by suitable power in reverse directions.

It will thus be seen that the bales may be compressed by means acting on the general principles described, so that their densities are substantially uniform, that they are compressed progressively or in increments, the greatest pressure being exerted at substantially the central portion of the bale, and that the power necessary to produce a given density is much less than that necessary in an ordinary reciprocating platen-press where the bale is compressed as a whole at once.

What I claim is—

1. In an oscillating cotton-press, the combination with oscillating platens between which the bale is compressed, of means for operating the platens, and automatic means for adjusting the relation of the platens, substantially as described.

2. In an oscillating cotton-press, the combination with oscillating platens between which the bale is compressed, of an engine, connections between the engine and oscillating platens, and automatic means for adjusting the relation of the platens, substantially as described.

3. In an oscillating cotton-press, the combination with oscillating platens between which the bale is compressed, of an engine, connections between the engine and platens for operating them, adjustable bearings for one of the platens, and means controlled by the operations of the engine for controlling the adjustable bearings, substantially as described.

4. In an oscillating cotton-press, the combination with oscillating platens between which the bale is compressed, of means for operating them, the platens having notches in their adjacent working faces whereby the bale-bands may be applied, substantially as described.

5. In an oscillating cotton-press, the combination with platens between which the bale is compressed, of a follower for forcing the bale between the platens, and means for operating the follower, substantially as described.

6. In an oscillating cotton-press, the combination with platens between the faces of which the bale is progressively compressed, of a follower for forcing the bale between the platens, and means for operating the follower, substantially as described.

7. In a bale-press, the combination with oscillating sector-shaped platens between which the bale is compressed, said platens provided with notches transverse to the periphery of their faces, and means for operating said sector-shaped platens, substantially as described.

In testimony whereof I have signed my name to this specification in the presence of two subscribing witnesses.

SAMUEL J. WEBB.

Witnesses:
F. L. FREEMAN,
W. CLARENCE DUVALL.